No. 616,964. Patented Jan. 3, 1899.
S. P. PICKETT.
ROTARY CORN POPPER OR COFFEE ROASTER.
(Application filed Apr. 21, 1898.)
(No Model.)
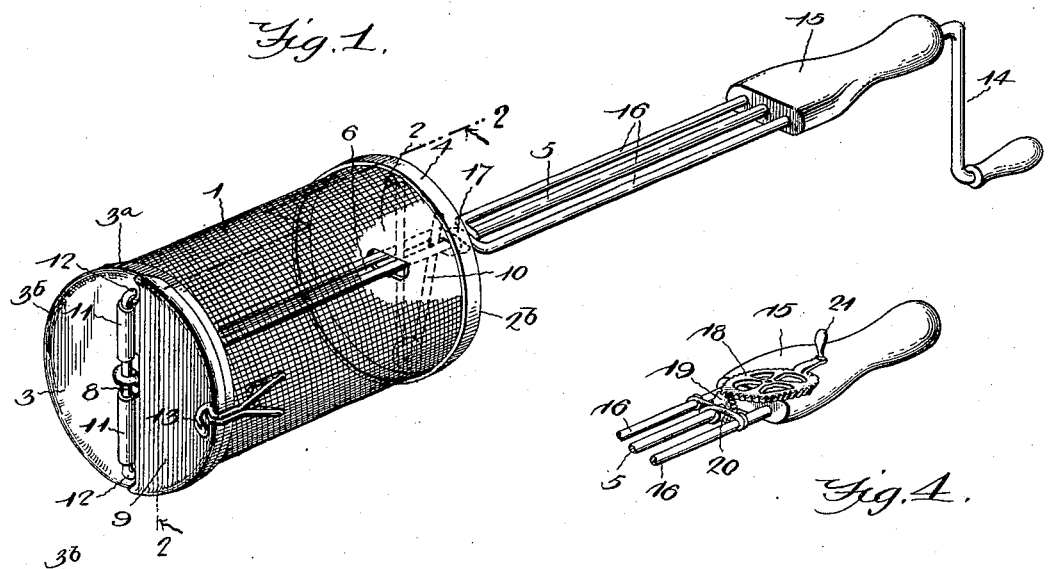
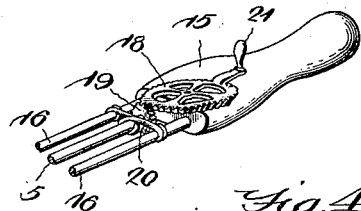
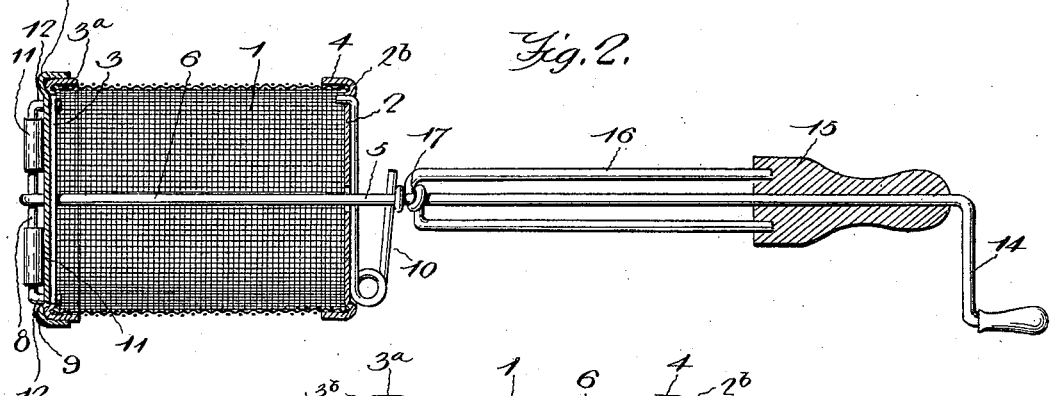
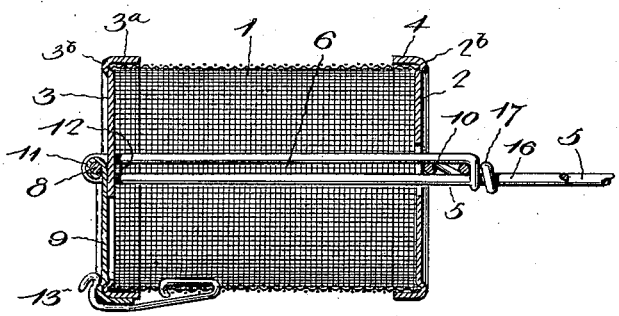
Witnesses  Sterling P. Pickett, Inventor.

UNITED STATES PATENT OFFICE.

STERLING P. PICKETT, OF WOODLAWN, MISSOURI.

ROTARY CORN-POPPER OR COFFEE-ROASTER.

SPECIFICATION forming part of Letters Patent No. 616,964, dated January 3, 1899.

Application filed April 21, 1898. Serial No. 678,382. (No model.)

*To all whom it may concern:*

Be it known that I, STERLING P. PICKETT, a citizen of the United States, residing at Woodlawn, in the county of Monroe and State of Missouri, have invented a new and useful Rotary Corn-Popper or Coffee-Roaster, of which the following is a specification.

The invention relates to improvements in rotary corn-poppers and coffee-roasters.

The object of the present invention is to improve the construction of corn-poppers and coffee-roasters and to provide a simple, inexpensive, and efficient device adapted to be readily handled and operated in connection with a small stove or similar heating apparatus and capable of uniformly subjecting corn or coffee to the action of the heat, so that coffee will be properly roasted and corn uniformly popped without scorching or burning it.

The invention consists in the construction and novel combination and arrangement of parts, as hereinafter fully described, illustrated in the accompanying drawings, and pointed out in the claims hereto appended.

In the drawings, Figure 1 is a perspective view of a corn-popper and coffee-roaster constructed in accordance with this invention. Fig. 2 is a longitudinal sectional view of the same on the line 2 2 of Fig. 1. Fig. 3 is a longitudinal sectional view of the receptacle, taken at right angles to Fig. 2. Fig. 4 is a detail view illustrating a modification of the operating mechanism.

Like numerals of reference designate corresponding parts in all the figures of the drawings.

1 designates a rotary receptacle consisting of a foraminous cylinder, of wire-gauze or other suitable material, and inner and outer heads or ends 2 and 3, provided at their peripheries with flanges 3ª and 4, receiving the end edges of the wire-gauze or other material. The ends or heads 2 and 3 are depressed adjacent to their outer edges to provide circumferential grooves 2ᵇ and 3ᵇ, which receive the edges of the wire-gauze cylinder and prevent the same from being bent inward. The receptacle is mounted on a shaft 5, which passes through the ends or heads 2 and 3 and serves to connect the parts of the receptacle, and the said shaft, which is constructed of wire or other suitable material, is bent upon itself to provide a longitudinal loop 6 at its outer portion. The loop 6, which has substantially parallel sides, is longer than the receptacle 1, extending outward beyond the same, and the ends or heads 2 and 3 are provided with central slots or openings through which the loop of the shaft passes. The outer end of the loop receives a pintle 8 of a hinged section or door 9, and the inner end of the loop receives a spring 10, which holds the parts together yieldingly to permit the gauze or other material of which the receptacle is constructed to expand under the influence of heat without injuring the device.

The outer end or head 3 of the receptacle 1 is provided with a substantially semicircular opening, and the pintle 8, which passes through eyes 11 of the hinged section or door 9, has its ends bent inward at right angles and engaging perforations of the head or end 3. The ends 12 of the pintle are retained in engagement with the perforations of the end or head 3 by the spring 10, which is substantially U-shaped, being composed of two arms and a connecting-coil. One of the arms is secured to the inner end or head 2 and passes through the loop 6, and the other arm, which also passes through the loop, is free and engages the inner end of the same, whereby the parts of the receptacle are securely held together.

The door or hinged section, which is provided at its periphery with a flange, is retained in its closed position by a catch 13, consisting of a single piece of wire doubled to form two sides. The engaging portion of the catch is bent to form a head, and the sides, which diverge, are bent upon themselves to form hooks which engage the meshes of the wire-gauze. The terminals of the hooks are also bent upon themselves to provide small hooks for engaging the wire-gauze to assist in holding the catch in position.

The outer end of the shaft is bent to form a crank-handle 14 and is provided with a suitable grip, and adjacent to the crank-handle the shaft is journaled in a central longitudinal opening of a handle 15, by which the device is held. The handle 15 carries a bearing-frame 16, constructed of wire or other suitable material and composed of parallel sides connected at their outer ends and having their inner terminals embedded in the handle 15 or otherwise secured to the same. The outer end of the bearing-frame is provided with an eye 17, receiving the shaft and formed by coiling the connecting portion of the oblong frame.

Instead of extending the shaft 5 through the handle 15 and providing a crank-handle at the end thereof, as illustrated in Figs. 1 and 2 of the accompanying drawings, the shaft may be operated by gearing, as shown in Fig. 4. This gearing consists of a cog-wheel 18, mounted on one side of the handle of the device and meshing with a pinion 19, which is fixed to the shaft adjacent to the cog-wheel 18. The shaft is supported by a transverse brace 20, provided at its center and ends with eyes which receive the shaft and the sides of the frame 16. This brace supports the parts and preserves the gearing in proper relation and prevents them from getting out of mesh. The cog-wheel is provided with a handle 21, by means of which the gearing is operated.

The invention has the following advantages:

The device, which is simple and comparatively inexpensive in construction, forms an efficient corn-popper and coffee-roaster, is adapted to expose corn and coffee uniformly to the action of the heat, and is capable of securing a complete popping of the corn and an even roasting of coffee without scorching or burning the material.

The parts of the device are readily assembled, and the spring yieldingly connects the ends or heads to the cylinder and permits the wire-gauze or other foraminous material employed to expand without injuring the receptacle.

The device can be conveniently held by the handle 15, and the operating-handle enables the receptacle to be readily rotated. The rotation of the receptacle thoroughly subjects the contents to the action of heat, and the shaft, which forms the stem of the device, offsets the receptacle sufficiently from the handle to enable the device to be conveniently operated in connection with a small stove or similar heating apparatus.

Changes in the form, proportion, and minor details of construction may be resorted to without departing from the spirit or sacrificing any of the advantages of the invention.

What I claim is—

1. A device of the class described comprising a receptacle composed of separable portions, a handle located at one end of the device and provided with a bearing, an oblong frame rigidly mounted on the inner end of the handle and provided at its other end with a complete eye or bearing, a shaft passing through the eye or bearing of the frame and arranged in the bearing of the handle, means for operating the shaft, and a spring located between the oblong frame and the receptacle and holding the parts thereof together, substantially as described.

2. A device of the class described comprising a receptacle composed of a foraminous body portion and removable heads or ends detachably arranged on the body portion, a shaft passing through the receptacle and engaging the outer head or end, and a spring engaging the shaft and the inner head or end and yieldingly connecting the parts, substantially as described.

3. A device of the class described comprising a receptacle composed of a body portion and removable heads or ends, the outer head or end being provided with an opening, a hinged section or door covering the opening and provided with a pintle, a shaft provided at its outer portion with a loop extending through the receptacle and receiving the pintle, a spring connected with the shaft and the inner head or end of the receptacle and holding the latter together, and a handle or bearing for the shaft, substantially as described.

4. A device of the class described comprising a receptacle having removable heads or ends, the outer head or end being provided with an opening, a hinged section or door covering the opening and provided with eyes, a pintle passing through the eyes and engaging the receptacle, a shaft having a loop passing through the receptacle and receiving the pintle, a spring mounted on the inner end of the receptacle and composed of two arms passing through the inner end of the loop and engaging the same, and a handle or bearing for the shaft, substantially as described.

5. A device of the class described comprising a shaft, a receptacle mounted on the shaft and composed of a body portion, and removable heads or ends having grooves receiving the edges of the body portion, a shaft carrying the receptacle, and a spring mounted on the shaft and holding the heads or ends of the receptacle against the body portion thereof, substantially as described.

In testimony that I claim the foregoing as my own I have hereto affixed my signature in the presence of two witnesses.

STERLING P. PICKETT.

Witnesses:
J. T. LOKEY,
I. N. TURNER, Jr.